United States Patent Office 2,767,013
Patented Oct. 16, 1956

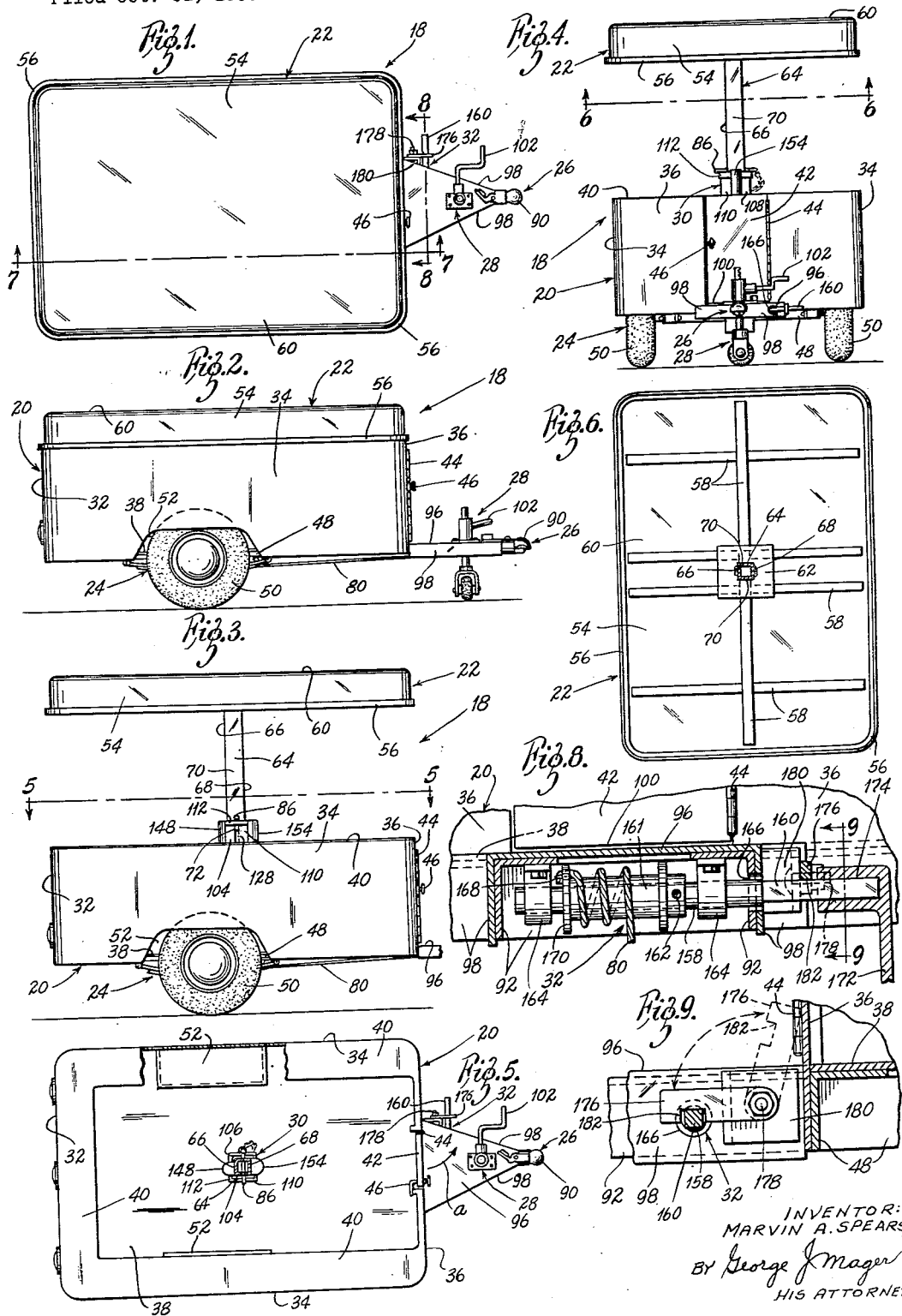

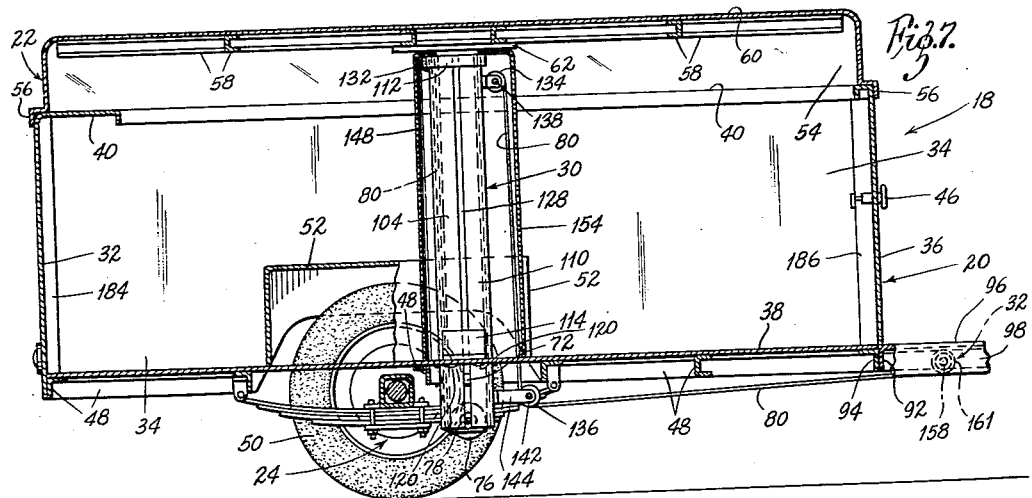
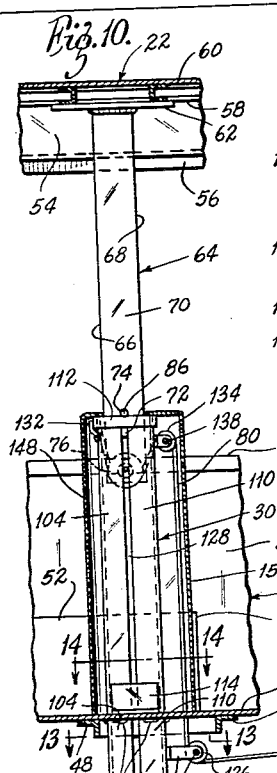
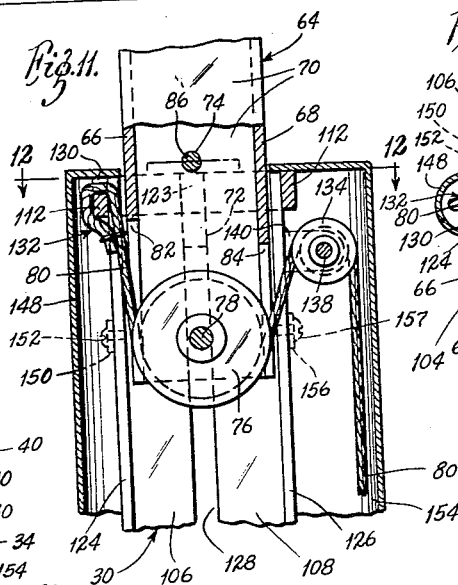
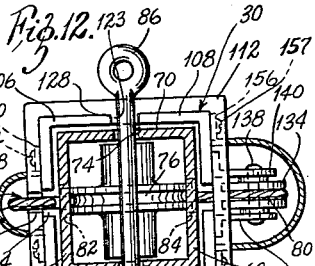
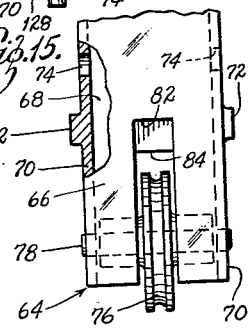
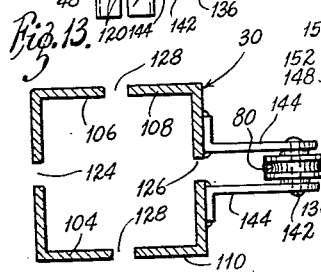
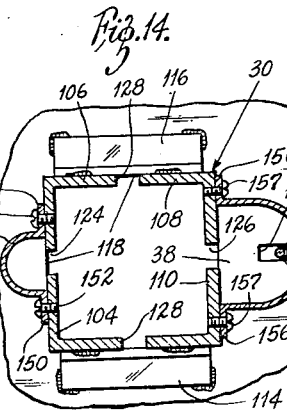
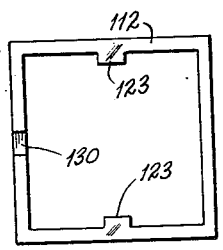

2,767,013

TRAILER BOOTH

Marvin A. Spears, Manchester, Mo.

Application October 31, 1955, Serial No. 543,877

3 Claims. (Cl. 296—21)

The present invention relates generally to equipment of the type that may be releasably connected to the rear end portion of an automotive vehicle and transported thereby. A structure of this type is commonly called a trailer.

More specifically, the present invention relates to a multi-purpose booth that may be transported in trailer fashion to any desired location, and may thereupon be disconnected from the automotive vehicle and set up quickly and easily for use.

To this end, the present booth incorporates a conventional vertically adjustable parking jack, whereby the booth may be positioned horizontally, and so maintained in conjunction with the wheels, thus providing a self-supporting unit. All components of the booth proper are of metal, the structural elements being welded together so as to provide a compact, rugged and safe unit.

Broadly, the booth of this invention comprises a generally rectangular body, preferably having rounded corners, and rigidly secured to and supported on a chassis of suitable structural steel members. The chassis is supported rearwardly of the transverse centerline thereof on an axle and wheels assembly that is of conventional design. At the front end of the booth, a triangular platform extends forwardly and terminates in a suitable hitch mechanism, whereby the booth may be releasably connected to a ball hitching element on the rear end of an automotive vehicle in the ordinary manner. A manually adjustable parking jack assembly is provided to support the forward end of the booth when in use. A door is provided in the booth body at the front end thereof to facilitate access to the interior of the booth. The upper end of the booth body terminates in an inwardly extending counter portion that is coextensive with the rear and side walls of said body.

Normally, that is when the booth is being transported and not set up for use, a cover member seals the interior of the booth against entry thereinto of rain, sleet, snow, dust, and so on. When the booth is set up for use, means are provided to elevate said cover member and maintain it in such position, thus to provide a canopy for the protection of the attendant and contents of the booth, as will appear.

It is here noted that in the description to follow and in the claims to be appended, this dual-function member will be termed the cover-canopy.

Generally speaking, the invention is relatively simple in construction. It includes no complicated operating mechanisms, and may be set up for use quickly by an individual. As hereinbefore implied, the booth of this invention may be employed in numerous capacities. For example, it may serve as a registration booth, a beverage dispensing stand, a sandwich or candy stand, and so on.

In view of the foregoing, the primary object of my invention is to provide a multi-purpose booth adapted to be readied for its intended purpose, then transported in trailer fashion to a desired location, thereupon disconnected from the automotive vehicle onto which it had been hitched, and then quickly set up for use.

It is another object of this invention to provide a cover-canopy for said booth, and means for elevating and lowering said cover-canopy.

Another object is to provide safety mechanisms insuring against fortuitous descent of the cover-canopy from the elevated position thereof.

It is a further object of the present invention to provide means for positioning the booth in a horizontal plane, so that an attendant standing within the booth may have a level floor whereon to tread.

Another object of the invention is to provide a platform onto which an attendant may step in entering or leaving the booth, said platform being flush with the floor of the booth.

A further object is to incorporate in the booth body a counter section that is co-extensive with the rear and side walls of said body, and to provide a latchable door in the front wall thereof.

The preferred embodiment thereof is illustrated on two sheets of drawings that accompany this specification, and a more comprehensive understanding of my invention may be had from the detailed description to follow with reference to said drawings, wherein:

Figure 1 is a view in top plan of a trailer booth embodying the principles of the present invention;

Figure 2 is a side elevation of said booth as it appears when set up prior to elevating the cover-canopy thereof;

Figure 3 is a view similar to Figure 2 demonstrating the cover-canopy in elevated disposition;

Figure 4 is a front elevational view of the booth with the cover-canopy disposed as in Figure 3;

Figure 5 is a top plan view, partly in section, taken on the line 5—5 of Figure 3;

Figure 6 is a bottom plan view, partly in section, taken on the line 6—6 of Figure 4;

Figure 7 is a longitudinal vertical sectional view on an enlarged scale, taken generally along the line 7—7 of Figure 1;

Figure 8 is a transverse vertical sectional view on an enlarged scale, taken on the line 8—8 of Figure 1 and including a crank member shown in operative disposition;

Figure 9 is a fragmentary view partly in section, taken on the line 9—9 of Figure 8, the aforesaid crank member being omitted to more clearly demonstrate the function of a latch bar;

Figure 10 is a reproduction of the central portion of Figure 7, illustrating the cover-canopy in the elevated disposition thereof appearing in Figures 3 and 4;

Figure 11 is a reproduction, on an enlarged scale and in vertical section, of a portion of the structure appearing in Figure 10;

Figure 12 is a top plan view, partly in section, taken on the line 12—12 of Figure 11;

Figure 13 is a horizontal sectional view on an enlarged scale, taken on the line 13—13 of Figure 10;

Figure 14 is a similar view taken on the line 14—14 of Figure 10;

Figure 15 is a rear end view of the lower portion of the cover-canopy support per se; and Figure 16 is a detail top plan view of a rectangular metallic band included in the structure illustrated in Figure 12.

With particular reference to Figures 1 through 4 of the drawings, numeral 18 indicates in its entirety a booth constructed in accordance with the teachings of the present invention. Broadly, the booth 18 includes a body generally designated 20; a cover-canopy assembly generally designated 22; a spring-equipped axle and wheels assembly 24; hitch mechanism 26; parking jack mechanism generally designated 28; a hollow guide post column 30 extending upwardly centrally in the body 20; and winch mechanism generally designated 32.

The body 20 of the booth is preferably rectangular with rounded corners as shown, and includes a rear wall 32, side walls 34, a front wall 36, and a bottom wall or floor 38. The rear and side walls terminate at the top in an inwardly projecting counter section 40 as best seen in Figure 5, and a door 42 is interpolated in the front wall. Said door is hingedly mounted as indicated at 44, and is provided with a suitable latch 46 adapted to releasably maintain the door in closed position.

The floor 38 of the booth rests on and is welded to a suitable structural framework or chassis 48, and the chassis is supported from the spring-equipped axle and wheels assembly 24 in conventional manner. It is noted that the wheels 50 of the assembly 24 are located inwardly of the side walls 34 and extend into the booth, a pair of recesses being provided in the floor 38 for that purpose, as is understood. To protect the attendant from contact with said wheels, and to seal the interior of the booth against entry thereinto of extraneous matter, a guard or shield 52 is provided for each wheel, as shown in Figures 5 and 7.

The cover-canopy assembly 22 comprises an inverted pan-shaped member 54 that terminates in a peripheral angular flange 56 adapted in the lowered position of the assembly, to rest on an overhang the peripheral upper edge of the body 20, as demonstrated particularly in Figure 7.

A reinforcing framework 58 is welded to the under surface of the cover member top wall 60, and centrally of said framework, there is welded thereto a rectangular metallic plate 62, as best seen in Figure 6.

Numeral 64 designates a tubular support for the cover-canopy. It is welded at its upper end to the plate 62, and is of rectangular configuration in cross section, as shown most clearly in Figure 12. The lower end portion of the support 64 is illustrated on an enlarged scale in Figure 15, where it is seen to include integrally a rearward segment 66, a forward segment 68, and side segments 70. Projecting laterally from each side segment 70 is a lug 72, and in upwardly spaced relation thereto, coplanar circular openings 74 are provided, as shown. A sheave 76 is rotatably mounted on a shaft 78 that has its ends supported in the side segments 70. To accommodate the sheave 76 and a cable 80 passing therebeneath in the manner shown in Figure 11, an elongated notch 82 is formed in the rearward segment 66, and a similar notch 84 is formed in the forward segment 68 of the tubular support 64. Numeral 86 designates a locking pin sized for insertion into and passage through the holes 74 for a purpose to appear hereinafter.

The hitch mechanism may be of any conventional design whereby to releasably connect the booth to a hitching element mounted on the rear end of an automotive vehicle. The mechanism 26 that is more or less schematically illustrated in the drawings, includes a socket 90, and means for connecting the socket onto a ball hitching element, as is well understood. Said hitching mechanism is rigid with the apex portion of a triangular frame 92, the base portion of the frame being welded to the chassis forward transverse structural member 94, as suggested in Figure 7.

A triangular plate 96 having downturned side marginal flanges 98 is welded to and covers the frame 92, said plate forming a platform onto which an attendant may step in entering and leaving the booth with the door 42 swung open as suggested by the arrow $a$ appearing in Figure 5. It is noted in this connection that as best shown in Figure 8 the platform 96 lies flush with the booth floor 38, and that clearance is provided between the bottom edge 100 of the door and the top surface of said platform.

The parking jack mechanism 28 is of conventional design and is rigidly connected to the platform 96. Its mode of operation is well known, and will therefore not be described in detail. Turning the crank 102 will result in the platform 96 together with the forward portion of the booth being raised or lowered, as is well understood.

The tubular support 64 of the cover-canopy assembly 22 is disposed for vertical movements in the hollow guide post or column 30. As best seen in Figures 12 through 14, the column 30 is of generally rectangular configuration in cross section, and includes four identical angle bars designated 104, 106, 108, and 110. These angle bars are maintained in the accurate spaced relationship illustrated, by means of a rectangular band 112 surrounding and welded to the upper extremities of said bars; by means of an angular bracket 114 having its horizontal flange welded to the floor 38 and its vertical flange welded to the angle bars 104 and 110; and by means of another angular bracket 116 having its horizontal flange welded to the floor 38 and its vertical flange welded to the angle bars 106 and 108.

A rectangular opening 118 is provided in the floor 38 as shown in Figure 14, said opening having a close fit about the column which extends therethrough to project below the floor, as clearly shown in Figure 10. Preferably, welds are applied to the underside of the floor and the four angle bars about the opening 118, as suggested at 120 in Figures 7 and 10. Attention is directed to Figure 16, where it is noted that the band 112 has a pair of integral inwardly projecting lugs 123. These lugs extend into the side slots 128, and form abutments at the top of said slots for a reason to appear.

From the foregoing, it should be apparent that the four angle bars are integrated to form a unitary hollow column that is rigidly supported centrally of the booth. In consequence of the spacing of the angle bars, four elongated open-ended slots are formed in the column 30. The rearward of these slots is designated 124, the forward slot is designated 126, and the two side slots are each designated 128. As will appear below, each of these four slots plays an important role in the operation of my invention.

With particular reference to Figures 11 and 12, it is noted that a notch 130 is formed in the band 112, this notch being located in line with the rearward slot 124. The upper end of the cable 80 is looped into the notch 130 and anchored therein as shown at 132. From the notch 130, the cable 80 extends downwardly through the slot 124 and notch 82 to pass under the sheave 76, then upwardly through the notch 84 and slot 126 to pass over a smaller sheave 134, then downwardly to pass under a sheave 136, and finally forwardly to the winch mechanism 32 that will be described below.

As shown particularly in Figure 12, the sheave 134 is rotatably mounted on a shaft 138 that is supported in spaced brackets 140, one of these brackets being welded or otherwise secured to the angle bar 108, the other bracket being secured to the angle bar 110. Similarly, as shown especially in Figure 13, the sheave 136 is rotatably mounted on a shaft 142 that is supported in spaced brackets 144, one of these brackets also being welded to the angle bar 108, the other bracket being welded to the angle bar 110. A suitable opening 146 is provided in the floor 38 for passage therethrough of said cable 80, as illustrated in Figure 14.

In order to obviate contact by an attendant moving about inside the booth with the anchored end of the cable 80, a suitable guard 148, preferably of the configuration shown, is provided. The guard 148 extends from the top of the column 30 to the floor 38, and is provided with pairs of vertically spaced ears 150 whereby with the aid of screws 152, it is maintained in place, as illustrated particularly in Figure 14.

Similarly, in order to obviate contact by an attendant moving about inside the booth with the sheave 134 and cable 80, a suitable guard 154, preferably of the configuration shown, is provided. The guard 154 extends from the top of the column 30 to the floor 38, and is provided with pairs of vertically spaced ears 156 whereby with the aid of screws 157, it is maintained in place, as also illustrated particularly in Figure 14.

As hereinbefore mentioned and as the drawings indicate, the cable 80 leads from the sheave 136 to the winch mechanism 32. With attention directed primarily to Figures 1, 8, and 9, it will be apparent that said mechanism is supported from the triangular frame 92 beneath the platform 96. The mechanism 32 includes a shaft 158 terminating at one end in an extension 160 of square cross-sectional contour, and a winch drum 161 secured to said shaft by a set screw 162 as shown, or otherwise. The shaft 158 is supported for rotation in spaced bearings 164 that are mounted in depending fashion on the frame 92, and a portion of said shaft extends through a circular opening 166 formed in the frame 92 and the adjacent flange portion 98 of the triangular platform plate 96.

The lower end portion of the cable 80 is trained about the winch drum 161, and the lower terminal end thereof is permanently secured or anchored as at 168 to one flange 170 of said winch drum. Numeral 172 designates an ordinary crank having a square socket 174 for application to the extension 160 of the winch shaft, as is understood.

Safety means are provided to releasably lock the shaft 158 against fortuitous rotation, particularly when the cover-canopy is in elevated position. To this end, a swingable latch bar 176 is pivotally mounted at one end on a bolt 178, the bolt in turn being fixed in an angle bracket 180 that is welded to the adjacent downturned flange 98 of the platform. As best seen in Figure 9, the free end of the latch bar 176 has formed therein a notch 182 wherein the shaft extension 160 is disposed when said latch bar is in locking position.

Prior to describing the operation of the mechanisms included in the invention, a few general observations will be given. Thus, it is noted that the booth body 20, the floor 38, the counter 40, and the platform plate 96 are fabricated from steel. The chassis 48 that supports the booth is rugged, and although not particularly illustrated in the drawings, said chassis includes longitudinal reinforcement also, so that the floor 38 is capable of sustaining heavy loads in addition to the weight of an attendant, and the weight of the structural column 30. The body 20 may also be reinforced, for example at the corners by means of uprights 184 as suggested in Figure 7, by uprights 186 on either side of the door 42, and so on. The cover-canopy assembly 22 is light in weight, being constructed entirely of aluminum with the exception of the sheave 76 and its supporting shaft 78. In actual practice, the three sheaves 76, 134, and 136 are of the ball bearing equipped type to insure smooth operation. The guard elements 148 and 154 may also be constructed of aluminum. The tire guards 52 however, are made of steel so that they may be used as shelves whereon for example to stack merchandise if desired. The cable 80 is a steel cable. The lugs 72 on the cover-canopy support 64 are appropriately dimensioned to freely pass by the brackets 114—116 and through the opening 118 when said support descends to its lowermost position.

Operation

Although it is believed that the mode of operation should be evident from the preceding description and an inspection of the drawings, a brief explanation will be given. Assuming that the booth 18 has been delivered to the desired location and unhitched from the automotive vehicle, the jack mechanism 28 would be adjusted by means of the crank 102 to dispose the platform 96 and thus also the floor 38 in a horizontal plane. Preferably but not necessarily, the groundwheel of the jack mechanism would be positioned transversely, as shown in Figure 2.

Thereupon, the crank 172 would be applied to the extension 160, and with the latch 176 swung to the broken line disposition thereof shown in Figure 9, said crank would be manually rotated clockwise. As a result, the cover-canopy 20 would be raised by the cable engagement with the sheave 76.

That is to say, as the lower portion of the cable 80 is wound about the winch drum 161, the support 64 therefor and the cover-canopy itself will rise until the luggs 72 engage the abutments 123 of the band 112. At this point the latch bar 176 would be swung downwardly into engagement with the extension 160, whereupon the crank 172 would preferably be removed.

Next, the locking pin 86 would be placed in position to extend through the circular openings 74 of the support 64, this disposition of said locking pin being demonstrated most clearly in Figure 12. Preferably, the locking pin 86 would be inserted from outside the booth. If desired, said pin may normally hang from one end of a chain the other end of which is secured to the column 30, as suggested in Figure 4. With these arrangements, it should be manifest that accidental descent of the cover-canopy is impossible.

The booth now having been set up for use, the attendant-to-be would manipulate the latch 46 and swing the door 42 to open position, thereupon step onto the platform 96 and thence onto the floor 38 inside the booth body, as should be manifest.

Assuming now that it were desired to condition the booth for transportation to another location, the door 42 would be latched to closed position, the locking pin 86 would be withdrawn, the latch bar 176 would be swung to the inoperative position thereof portrayed by broken lines in Figure 9, and thereupon the crank 172 would be applied and slowly rotated counter-clockwise until the flange 56 of the cover-canopy came to rest upon the peripheral edge of the counter section 40. This condition of the booth 18 is demonstrated in Figure 7.

In view of the foregoing description augmented by an inspection of the drawings, it is believed that an adequate and comprehensive disclosure of the present invention has been presented. It is to be understood however that the precise details of construction illustrated and described may be modified somewhat without departing from the spirit and scope of my invention as set forth in the claims hereunto appended.

What I claim is:

1. In a trailer booth including parking jack means whereby to set up the booth in self-supporting status, the combination of: a generally rectangular booth body having a front and a rear wall, side walls and a floor; a continuous counter section projecting inwardly from the top portions of said rear and side walls; a vertically movable cover-canopy assembly for the booth comprising an inverted pan-shaped member that terminates in a peripheral angular flange portion adapted in the lowered position of said assembly to rest on and overhang the peripheral upper edge of said booth body whereby to seal the interior thereof against entry of extraneous matter, and a depending tubular support of rectangular cross-sectional configuration rigid at its upper end with said pan-shaped member and having a sheave rotatably mounted in its lower end portion; a vertically disposed hollow column mounted centrally in the booth, said column being of generally rectangular configuration in cross-section and comprising four identical angle bars maintained in accurate spaced relationship by means of a rectangular band surrounding and welded to the upper extremities of said bars, and a pair of angular brackets each having its vertical flange secured to the lower portions of two of said bars and its horizontal flange secured to the floor of the booth body about a rectangular opening provided in said floor, the lower extremities of said bars projecting through said opening to terminate below the booth; a manually operable winch mechanism including a winch fixed to a rotatable shaft terminating in a square extension; a cable passing under said sheave slidably supporting said depending tubular support in the hollow column, said cable having one end anchored to said rectangular band and the opposite end to said winch; a pivoted latch bar for engaging the square winch shaft extension to prevent fortuitous rotation thereof when the cover-canopy is in elevated position; a platform flush with the floor, and a latchable door interpolated in the front wall of the booth to facilitate entry thereinto; and a pin insertable into coplanar openings in said depending tubular support with its projecting ends resting on the top of the hollow column to prevent fortuitous descent of the cover-canopy.

2. In a booth of the character described, the combination comprising: a rectangular booth body including a front and a rear wall, side walls and a floor; a continuous counter section projecting inwardly from the top portions of said rear and side walls; a vertically disposed hollow column mounted centrally in the booth, said column being of generally rectangular configuration in cross-section and comprising four identical angle bars maintained in accurate spaced relationship by means of a rectangular band surrounding and welded to the upper extremities of said bars, and a pair of angular brackets each having its vertical flange secured to the lower portions of two of said bars and its horizontal flange secured to the floor of the booth body about a rectangular opening provided in said floor, the lower extremities of said bars projecting through said opening to terminate below the booth; a cover-canopy assembly for the booth, said assembly including a tubular support of rectangular cross-sectional configuration slidable in said column; a sheave rotatably mounted in the lower end portion of the tubular support; winch mechanism including a cable having one end anchored to said rectangular band and passing thence beneath said sheave to control the disposition of the cover-canopy assembly relatively to said column; a pair of opposed lugs on the rectangular band projecting inwardly, and a pair of opposed lugs on the tubular support projecting outwardly into the spaces defined by opposed pairs of said column angle bars to limit upward movements of the cover-canopy assembly; opposed coplanar circular openings in the support, said openings being in upwardly spaced relation relatively to the outwardly projecting lugs aforesaid; and a pin adapted to be passed through said openings and have its projecting ends rest on the top of said column when the lugs on the support abut against the lugs of said rectangular band.

3. In combination: a rectangular booth body having a floor; a vertically disposed hollow column mounted centrally in the booth, said column being of generally rectangular configuration in cross-section and comprising four identical angle bars maintained in accurate spaced relationship by means of a rectangular band surrounding and welded to the upper extremities of said bars; and a pair of angular brackets each having its vertical flange secured to the lower portions of two of said bars and its horizontal flange secured to the floor of the booth body about a rectangular opening provided in said floor, the lower extremities of said bars projecting through said opening to terminate below the booth; a cover-canopy rigid with the upper end portion of a tubular support extending into and adapted to be reciprocated in said hollow column; a pair of opposed lugs on the lower end portion of said support cooperating with a pair of opposed lugs on said rectangular band to limit reciprocation of the support in an upward direction; a first sheave rotatably mounted in the lower end portion of said support; a second sheave rotatably supported in spaced brackets rigid with the upper end portion of the hollow column; a third sheave rotatably supported in spaced brackets rigid with the lower end portion of the hollow column below said booth floor; a manually operable winch; a cable having its lower end anchored to said winch and its upper end anchored to a notched portion of the rectangular band aforesaid that is welded to the upper end of said hollow column, said cable extending downwardly from the last named anchorage to engage under the first sheave, thence upwardly to engage over said second sheave, thence downwardly through an opening in said booth floor to engage under said third sheave, thence onwardly to wind about said winch and terminate at the first named anchorage; a pair of opposed elongated notches in said lower end portion of the tubular support whereinto the peripheral portion of said first sheave extends, and wherethrough said cable passes; and locking pin means to releasably maintain said cover-canopy in elevated disposition.

References Cited in the file of this patent

UNITED STATES PATENTS

| | | |
|---|---|---|
| 989,744 | Wilmot | Apr. 18, 1911 |
| 1,902,820 | Ball | Mar. 28, 1933 |
| 2,168,661 | Anderson et al. | Aug. 8, 1939 |
| 2,729,497 | Runyan | Jan. 3, 1956 |

FOREIGN PATENTS

| | | |
|---|---|---|
| 750,020 | France | Jan. 12, 1924 |
| 652,823 | Great Britain | May 2, 1951 |